(12) United States Patent
Home

(10) Patent No.: US 8,550,111 B2
(45) Date of Patent: Oct. 8, 2013

(54) MECHANISM FOR CONTROLLING A GAUGE FOR INDICATING THE AMOUNT OF GAS REMAINING IN A GAS TANK

(75) Inventor: William Home, Taipei (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 217 days.

(21) Appl. No.: 13/097,052

(22) Filed: Apr. 28, 2011

(65) Prior Publication Data

US 2011/0197994 A1    Aug. 18, 2011

Related U.S. Application Data

(63) Continuation-in-part of application No. 12/135,223, filed on Jun. 9, 2008, now abandoned.

(51) Int. Cl.
*F16K 31/24* (2006.01)

(52) U.S. Cl.
USPC ........... 137/413; 137/442; 137/446; 137/558; 73/317; 141/98; 141/198

(58) Field of Classification Search
USPC ......................... 137/413, 434, 442, 446, 558; 116/227–229; 73/305, 306, 317, 318; 251/250, 77, 78; 141/95, 198
See application file for complete search history.

(56) References Cited

U.S. PATENT DOCUMENTS

| | | | | |
|---|---|---|---|---|
| 1,456,701 A * | 5/1923 | Lundquist | | 73/318 |
| 1,464,022 A * | 8/1923 | Baumgardner | | 137/446 |
| 1,517,905 A * | 12/1924 | Hough | | 73/216 |
| 1,607,751 A * | 11/1926 | Rippingille | | 73/318 |
| 2,091,222 A * | 8/1937 | Thomas | | 73/54.13 |
| 2,325,582 A * | 7/1943 | Andersen | | 116/229 |
| 2,405,247 A * | 8/1946 | Weaver | | 73/318 |
| 2,627,178 A * | 2/1953 | Hayward et al. | | 73/305 |
| 2,724,404 A * | 11/1955 | Kass | | 137/446 |
| 5,072,618 A * | 12/1991 | Taylor et al. | | 73/317 |
| 5,551,466 A * | 9/1996 | De Pieri | | 137/446 |
| 6,138,709 A * | 10/2000 | Home | | 137/413 |
| 6,178,994 B1 * | 1/2001 | Park | | 137/413 |
| 6,584,867 B2 * | 7/2003 | Kennedy | | 251/250 |
| 7,219,686 B2 * | 5/2007 | Schmitz et al. | | 137/413 |
| 7,726,334 B2 * | 6/2010 | Ross et al. | | 137/558 |
| 7,934,694 B2 * | 5/2011 | Bunyard | | 251/250 |
| 8,191,860 B2 * | 6/2012 | Eschborn et al. | | 251/250 |
| 2008/0078467 A1 * | 4/2008 | Home | | 141/95 |
| 2010/0025610 A1 * | 2/2010 | Eschborn et al. | | 251/250 |

* cited by examiner

*Primary Examiner* — Craig Schneider
*Assistant Examiner* — Craig J Price
(74) *Attorney, Agent, or Firm* — Leong C. Lei

(57) ABSTRACT

An overfill prevention device which includes a first tubular member, a cylindrical piston fitted within the first tubular member, a second tubular member having a cylindrical recess open, a plug arranged within the second tubular member, a float rod having a cam plate, a float connected with a lower end of the float rod, a valve body having a lower end engaged with the first tubular member, a pinion pivotally connected to the second tubular member by the pin, a toothed rack meshed with the pinion and engaged with the second tubular member, a control rod having an upper end extending into the valve body and a lower end secured to the toothed rack, a first magnet mounted at the upper end of the control rod, and a gauge mounted on the valve body and provided with a second permanent magnet and a needle operatively connected with the second magnet.

3 Claims, 14 Drawing Sheets

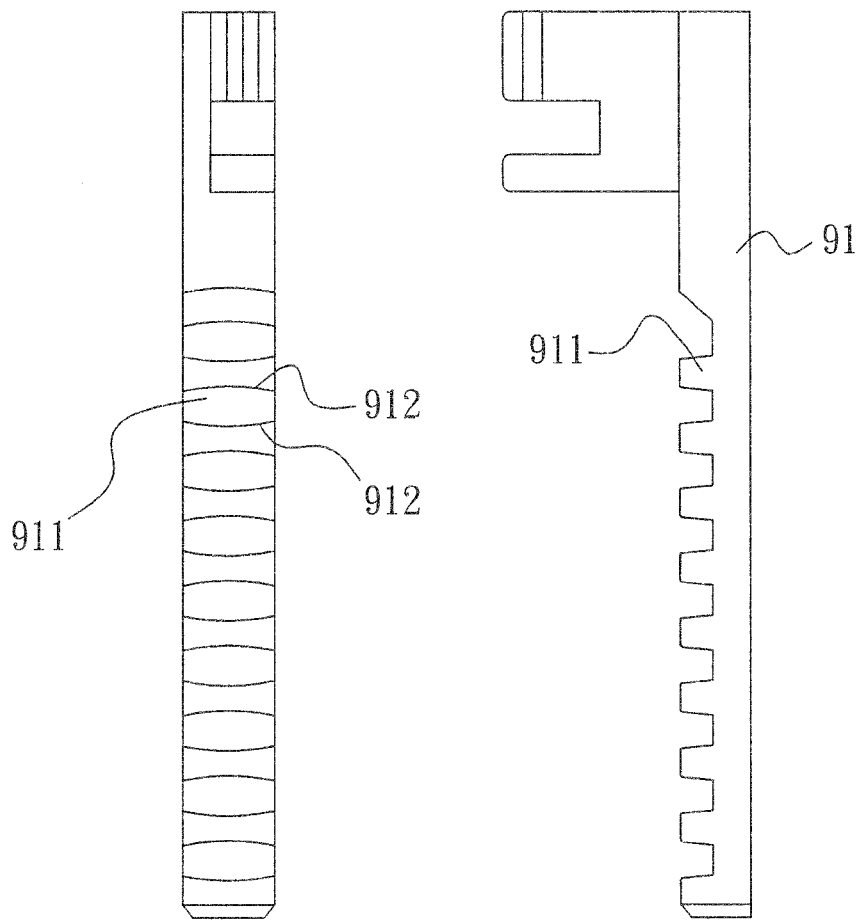

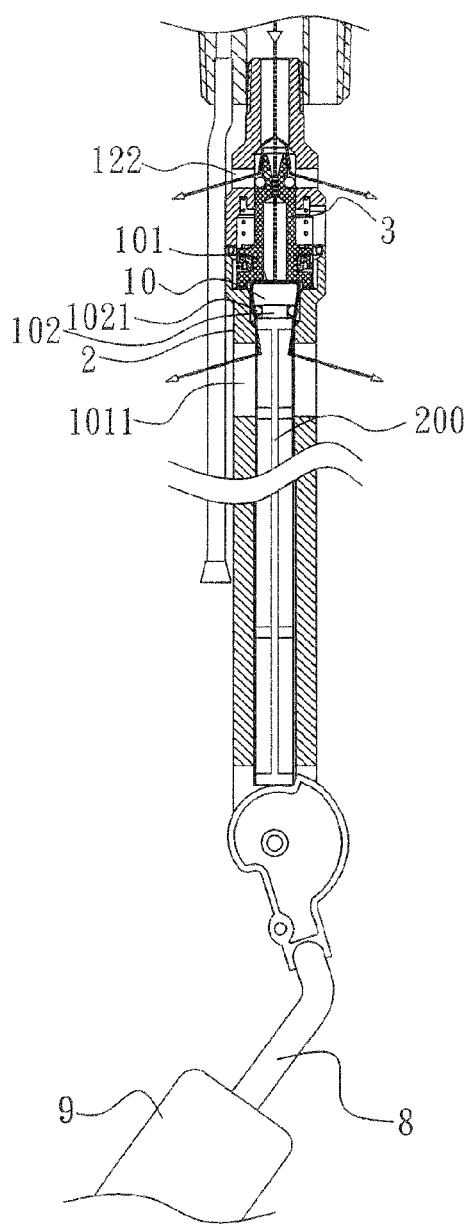
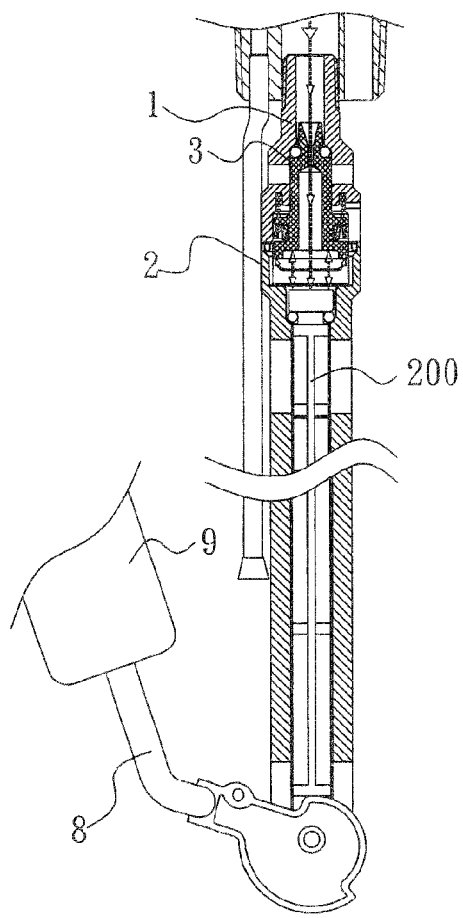
FIG. 8
FIG. 9

MECHANISM FOR CONTROLLING A GAUGE FOR INDICATING THE AMOUNT OF GAS REMAINING IN A GAS TANK

CROSS-REFERENCE

This application is a continuation-in-part of the patent application Ser. No. 12/135,223 filed Jun. 9, 2008, now abandoned and is related to U.S. Pat. No. 6,138,709, owned by the same applicant.

BACKGROUND OF THE INVENTION (a) Technical Field of the Invention

This invention is related to a mechanism which is arranged in an overfill prevention device and used for controlling a gauge for indicating the amount of gas remaining in a gas tank.

(b) Description of the Prior Art

Combustible liquefied gas is convenient for us to carry out combustion operation, and especially as liquefied gas burns completely The burning is very clean, and unlike coal, no black smoke will be produced. Hence, liquefied gas is widely used for heating, and cooking. Further, liquefied gas is also used for welding and manufacturing. However, no matter what kind of liquefied gas is used, they must all be filled in a gas tank in order to facilitate their transportation. When in use, the outlet of the gas tank is connected to the gas appliance, so that when the gas tank valve is turned on, the liquefied gas will flow to the burner of the gas appliance for burning.

Generally, the conventional gas tank is provided with a simple valve. When the liquefied gas is decreased to a level such that it is insufficient for cooking a meal, the user cannot perceive this, so that it often happens that cooking will be interrupted as a result. Thus, the user has to purchase a new gas tank or refilling gas in order to continue cooking, which is inconvenient, particularly for people located far from gas stations or the like. However, it is also dangerous to have multiple gas tanks in the home.

Schmitz et al (U.S. Pat. No. 7,219,686) discloses a tap assembly for a liquid vessel having an overfill protection device and a float controlled magnetic level gauge, wherein, a crank mechanism is provided between the float lever and the rod of the level gauge to cause the rod to effectuate a swinging movement and simultaneously displace the rod longitudinally to cause linear displacement of the permanent magnet in the valve body bore. However, since the rod is driven in a swinging movement, the upper end of the rod would be easily stuck thereby making it unfit for practical use.

Lundquist (U.S. Pat. No. 1,456,701) discloses a liquid level gage which comprises in combination a vertically movable indicator member, a flexible wire attached directly thereto, a float and float-actuated means operated by the upward movement of the float and connected directly to the other end of the wire for exerting a pull upon the wire and lowering the indicator member. Nevertheless, the Lundquist reference is designed for use with gasoline or diesel in which the buoyancy of a float is approximately 3~4 times as much as that in a liquefied gas. Hence, the Lundquist reference is workable in gasoline or diesel, but it would not be workable to apply such a high friction mechanism to be used in liquefied gas where the buoyancy received by the float is small.

Therefore, it is an object of the present invention to provide an overfill prevention device with a gauge for indicating the amount of gas remaining a gas tank which can obviate and mitigate the above-mentioned drawbacks.

SUMMARY OF THE INVENTION

This invention is related to a mechanism which is arranged in an overfill prevention device and used for controlling a gauge for indicating the amount of gas remaining in a gas tank.

According to a preferred embodiment of the present invention, there is provided an overfill prevention device which includes a first tubular member, a cylindrical piston fitted within the first tubular member, a second tubular member having a cylindrical recess open, a plug arranged within the second tubular member, a float rod having a cam plate, a float connected with a lower end of the float rod, a valve body having a lower end engaged with the first tubular member, a pinion pivotally connected to the second tubular member by the pin, a toothed rack meshed with the pinion and engaged with the second tubular member, a control rod having an upper end extending into the valve body and a lower end secured to the toothed rack, a first magnet mounted at the upper end of the control rod, and a gauge mounted on the valve body and provided with a second permanent magnet and a needle operatively connected with the second magnet.

It is the primary object of the present invention to provide a mechanism which utilizes a float movement to rotate a pinion which in turn drives a toothed rack to accurately indicate the amount of gas remaining in a gas tank.

It is still another object of the present invention to provide an overfill prevention device with a gauge for indicating the amount of gas remaining in a gas tank which has a very short purging time.

It is still another object of the present invention to provide an overfill prevention device with a gauge for indicating the amount of gas remaining in a gas tank which is simple in construction.

It is a further object of the present invention to provide an overfill prevention device with a gauge for indicating the amount of gas remaining in a gas tank which is cheap and easy to manufacture.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3D is a front view of the toothed rack;

FIG. 3E is an end view of the toothed rack;

FIG. 3F is a side view of the toothed rack;

FIG. 7A is a front view of the gauge indicating the amount of gas remaining in the gas tank;

FIG. 8 is a longitudinal sectional view of the present invention in the filling position;

FIG. 9 is a longitudinal sectional view of the present invention in the stop-fill position.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
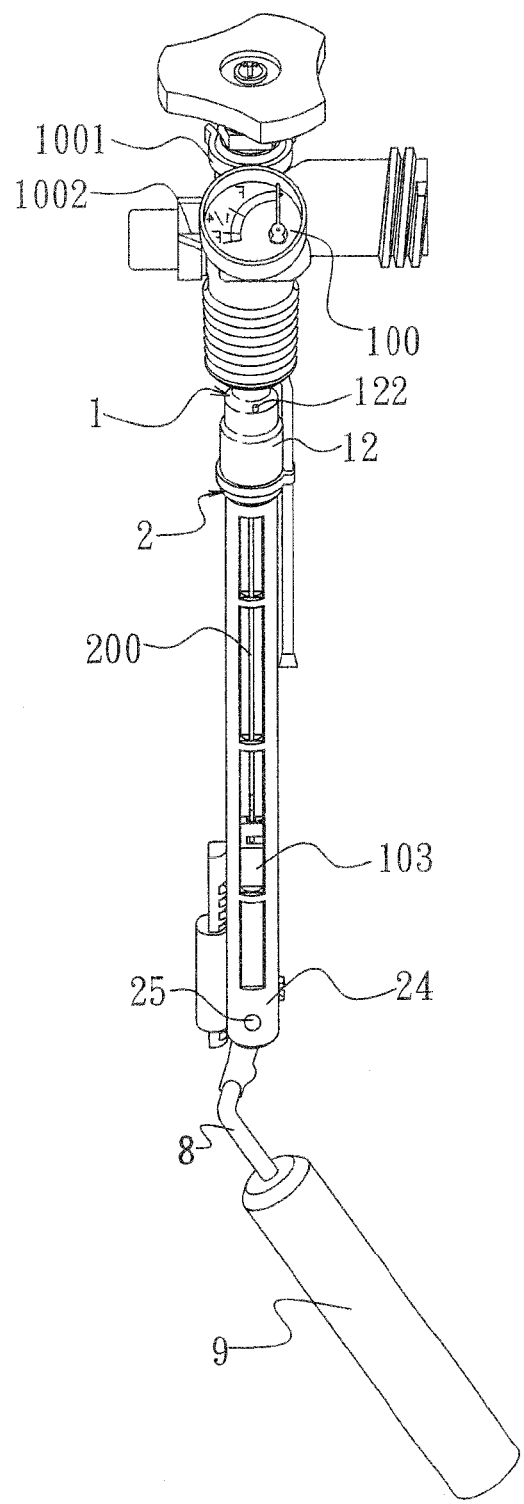
FIG. 1 is a perspective view of the present invention.
Figure 2:
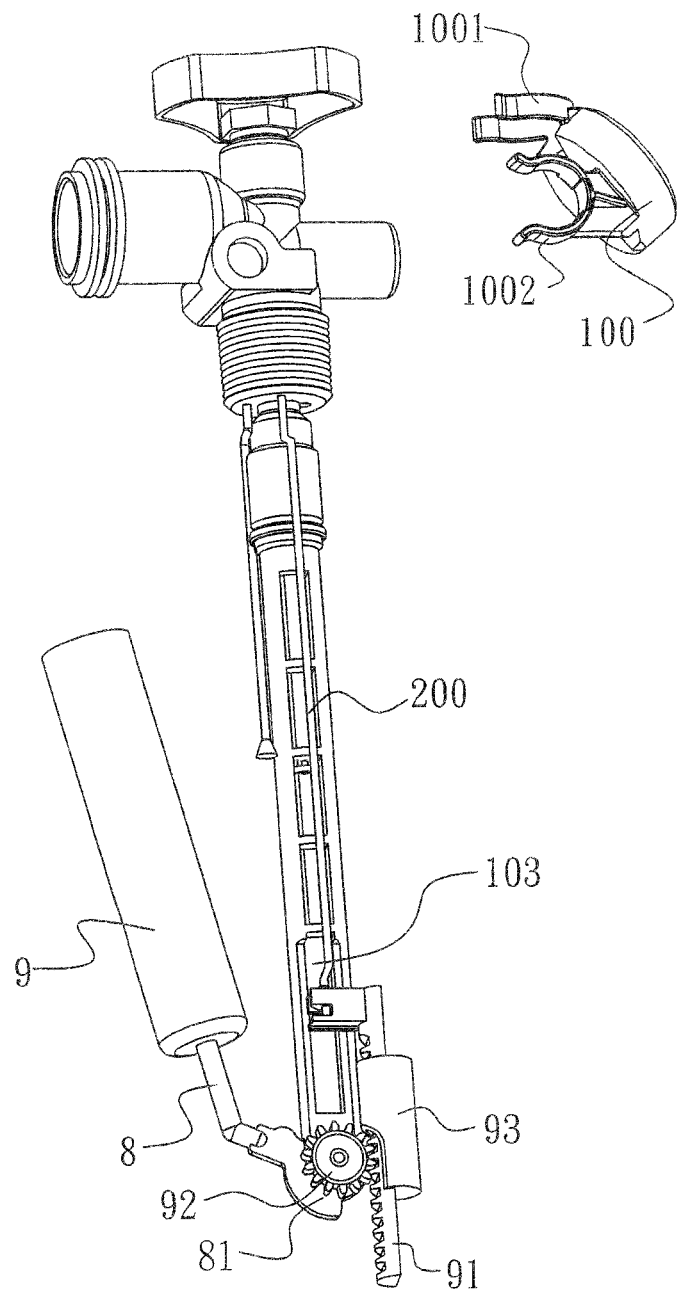
FIG. 2 is an exploded view of the present invention.
Figure 2A:
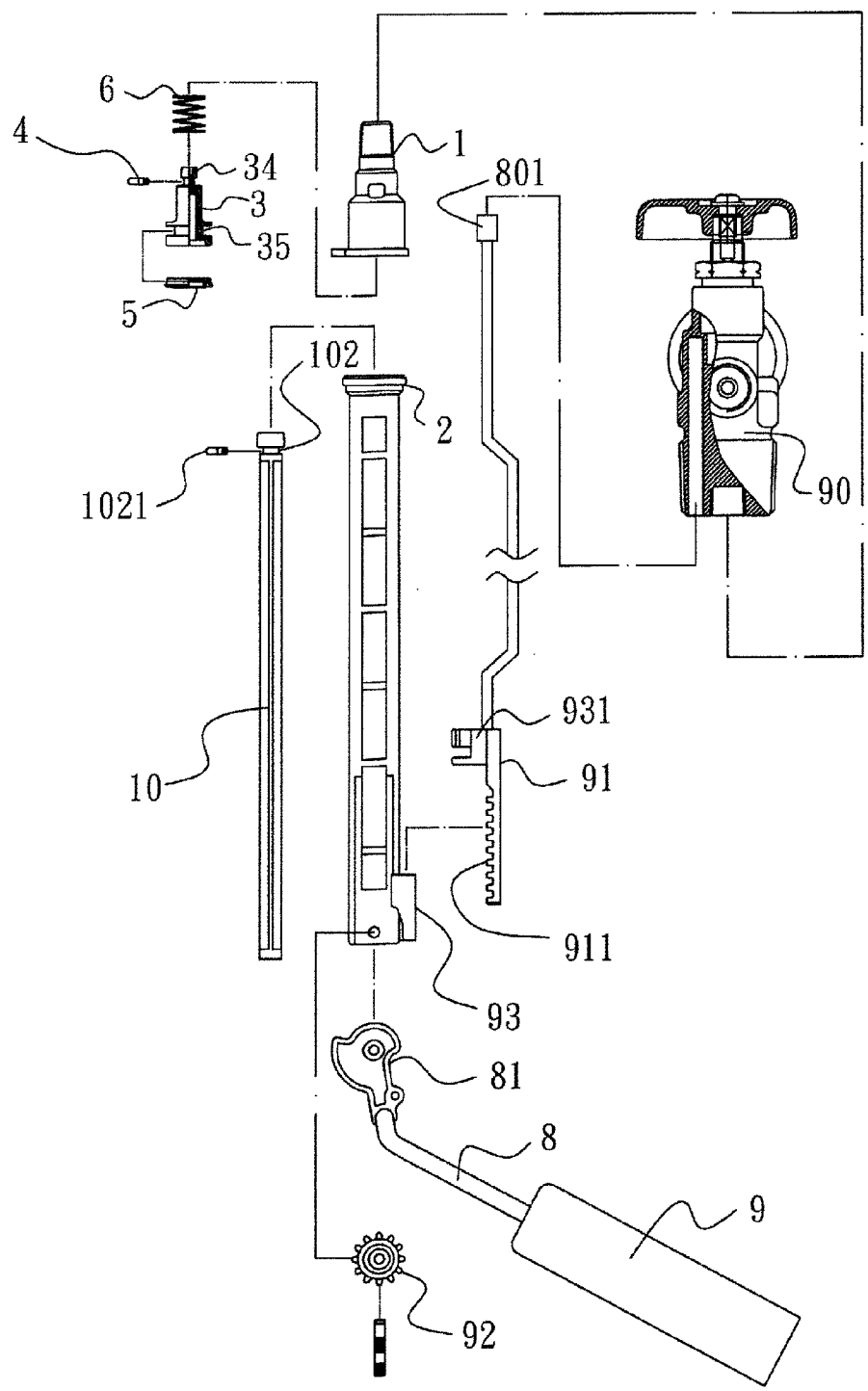
FIG. 2A is an exploded view showing a portion of the invention to illustrate details of components thereof.
Figures 3, 3A, 3B:
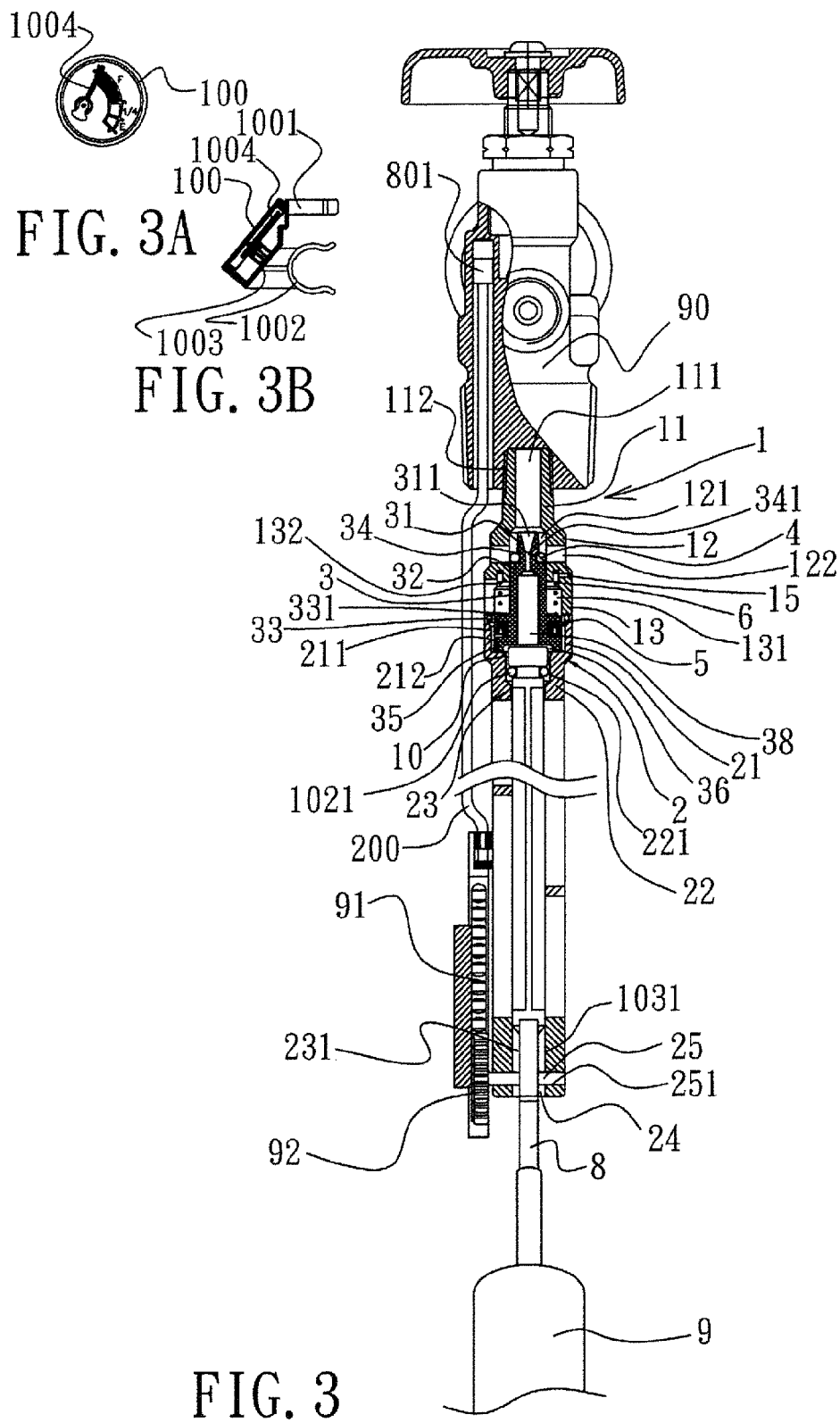
FIG. 3 is a longitudinal sectional view of the present invention.
FIG. 3A is a front view of the gauge according to the present invention.
FIG. 3B is a side view of the gauge according to the present invention.
Figure 3C:
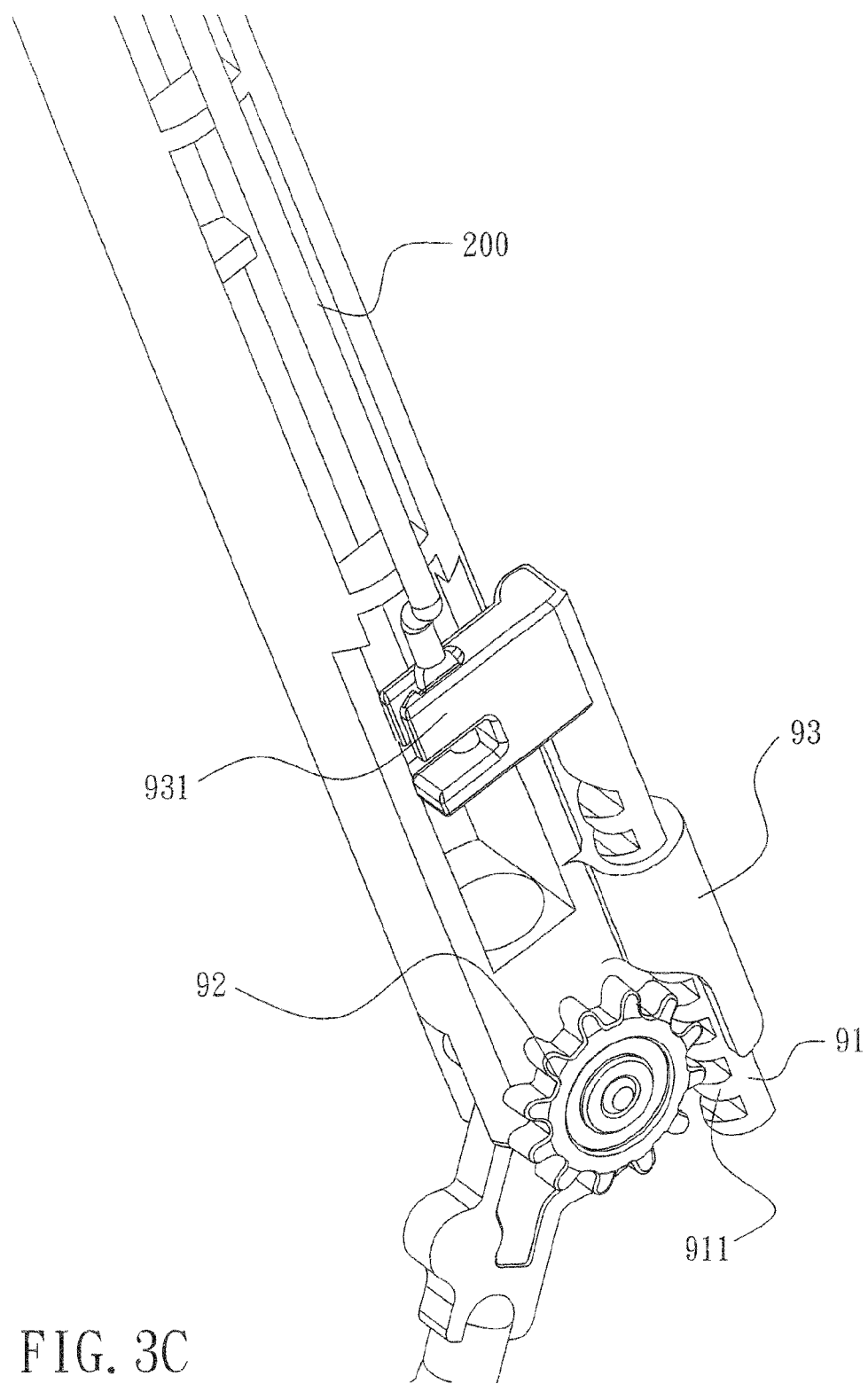
FIG. 3C is an enlarged view showing the engagement between the pinion and the toothed rack.
Figure 3G:
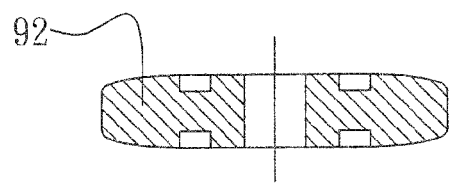
FIG. 3G is a sectional view of the pinion.
Figure 3H:
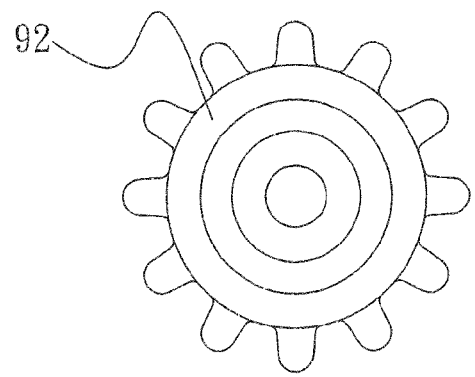
FIG. 3H is a front view of the pinion.
Figures 3I, 3J:
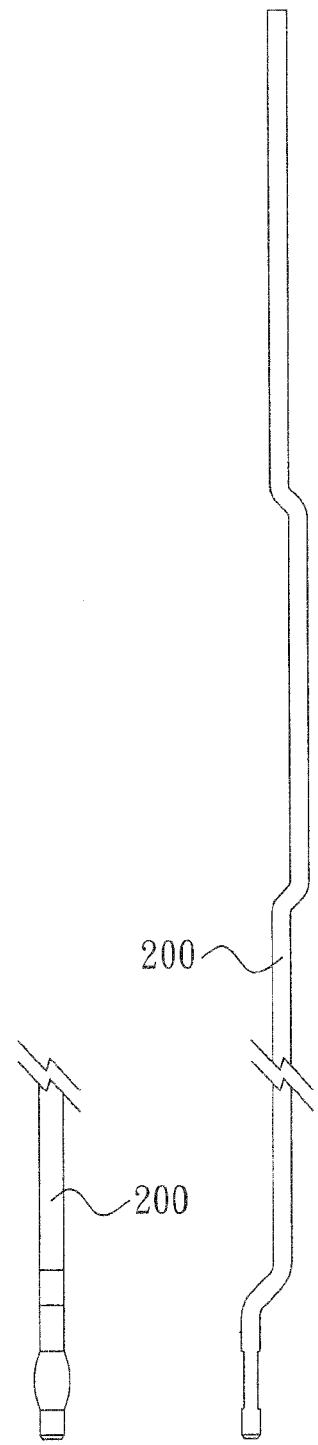
FIG. 3I is a front view of the control rod.
FIG. 3J is a side view of the control rod.
Figures 3K, 3L:
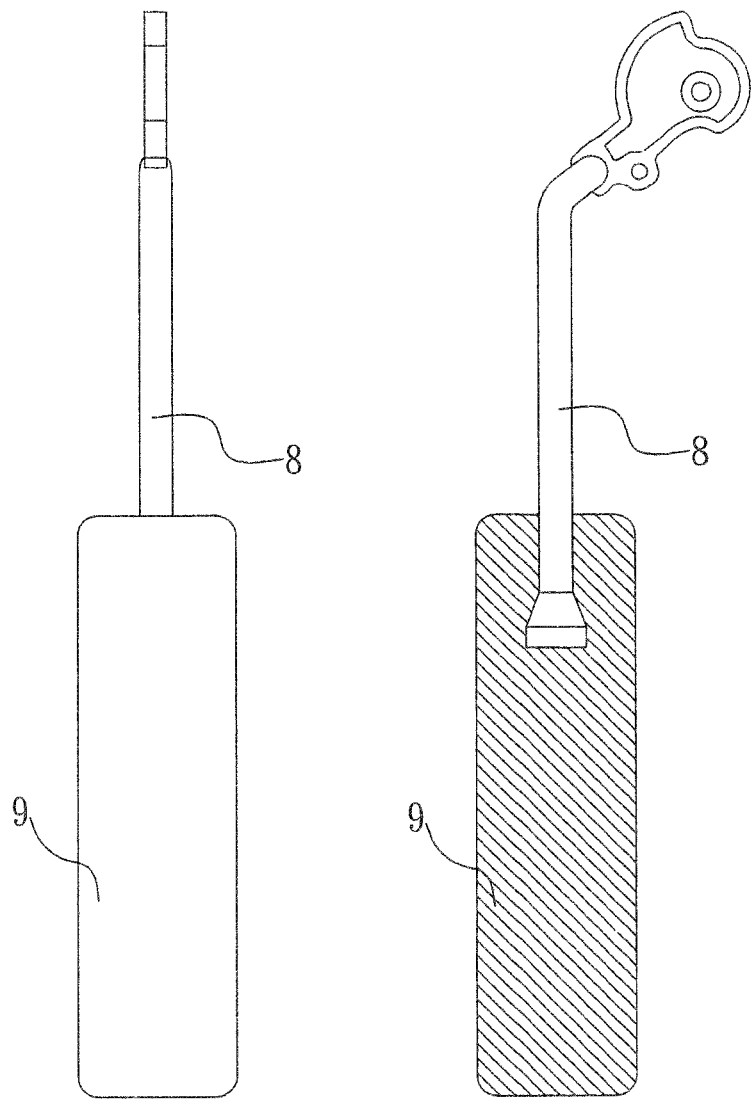
FIG. 3K is front view of the float.
FIG. 3L is a side view of the float.
Figure 4:
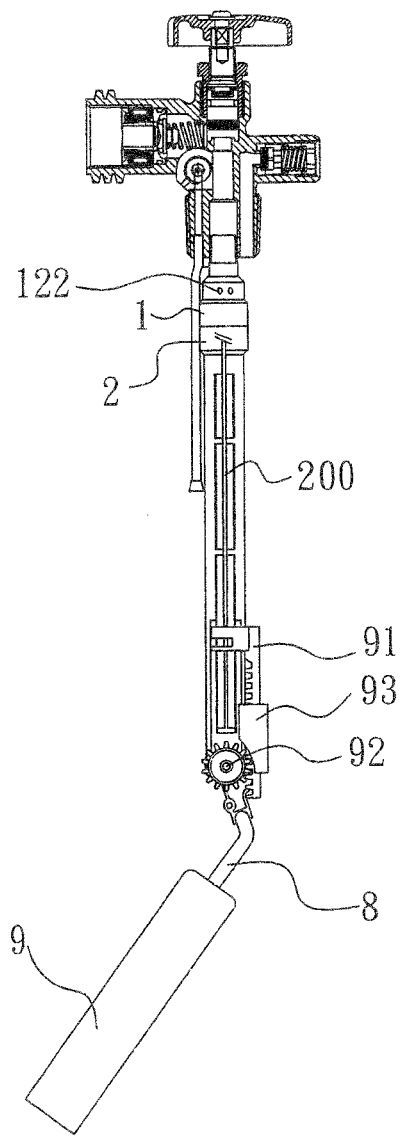
FIG. 4 is another longitudinal sectional view of the present invention.

Referring to FIGS. 1, 2, 2A 3, 3A-3L, 4, 8, 9 and 10, the overfill prevention device with the mechanism for controlling a gauge for indicating the amount of gas remaining in a gas tank according to the present invention generally comprises a first tubular member 1 (see FIGS. 1 and 4), a second tubular member 2 (see FIGS. 1 and 4), a piston 3 (see FIGS. 3, 8 and 9), a first O-ring 4 (see FIG. 3), a second O-ring 5 (see FIG. 3), a compressed spring 6 (see FIG. 3), a pinion 92 (see FIGS. 2, 3, 4, 8, 9 and 10), a toothed rack 91 (see FIGS. 2, 3, 4, 8, 9 and 10), a float rod 8 (see FIGS. 1, 2 and 3), a float 9 (see FIGS. 1, 2 and 3), a plug 10 (see FIGS. 3 and 8), a control rod 200 (see FIGS. 1, 2, 3), a pressure valve having a valve body 90 (see FIG. 9), and a gauge 100 (see FIGS. 3A and 3B).

The first tubular member 1 has an upper portion 11 formed with a first axial through hole 111 and external threads 112, an intermediate portion 12 having a second axial through hole 121 with a larger diameter than the first axial through hole 111 of the upper portion 11 and two radial through holes 122, and a lower portion 13 having a third axial through hole 131 with a larger diameter than the second axial through hole 121 of the intermediate portion 12. An annular groove 132 is formed between the second and third axial through holes 121 and 131. The first tubular member 1 is formed with a radial perforation 15 which extends therethrough to communicate with the annular groove 132 so that the pressure required for the operation of the piston 3 can be reduced thus making the overfill prevention device become more sensitive. According to the experiment, the preferred diameter of the radial perforation 15 is around 1 mm+0.5 mm. The two radial through holes 122 are aligned with each other.

The piston 3 is a cylindrical member with an upper portion 31 dimensioned to fit into the first axial through hole 111 of the first tubular member 1, an intermediate portion 32 having a larger diameter than the upper portion 31 and dimensioned to fit into the second axial through 121 of the first tubular member 1, a lower portion 33 having a larger diameter than the intermediate portion 32 and dimensioned to fit into the third axial through hole 131 of the first tubular member 1, a first neck portion 34 between the upper and intermediate portions 31 and 32, a second neck portion 35 on lower portion 33, and a circular recess 36 at the bottom of the lower portion 33. The upper portion 31 of the piston 3 is formed with a conical through hole 311 having an upper diameter and a lower diameter which are in the ratio of three to one. The first neck portion 34 has an axial through hole 341 having the same diameter as the lower end of the conical through hole 311. An axial through hole 38 is formed in the intermediate and lower portions 32 and 33 and has an upper and lower ends communicated with the axial through hole 341 and the circular recess 36 respectively. The piston 3 is slidably disposed within the first tubular member 1.

The compressed spring 6 is arranged within the third axial through hole 131 of the lower portion 13 of the first tubular member 1 and fitted over the intermediate portion 32 of the piston 3, with its upper and lower ends respectively bearing against the annular groove 132 of the first tubular member 1 and the flange 331 of the lower portion 33 of the piston 3.

The first and second O-rings 4 and 5 are fitted in the first and second neck portions 34 and 35 of the piston 3, respectively.

The second tubular member 2 has an upper portion 21 having a cylindrical recess 211 open at the top and joined with the lower end of the first tubular member 1 by ultrasonic welding, an intermediate portion 22 having an axial through hole 221 with a smaller diameter than the third axial through hole 131 of the first tubular member 1, and a lower portion 23 having an axial through hole 231 with a smaller diameter than the axial through hole 221 of the intermediate portion 22. The lower end of the second tubular member 2 is divided by a diametrical slot 24 into two similar semi-cylindrical portions and has a radial circular hole 251 extending through the two semi-cylindrical portions. The pinion 92 is pivotally mounted at the lower end of the second tubular member 2 by a pin 25 extending through the radial circular hole 251. The second tubular member 2 is formed with a protruded block 93 through which is slidably fitted the toothed rack 91. The toothed rack 91 is threadedly engaged with the pinion 92. As shown in FIGS. 3C, 3D, 3E and 3F, the toothed rack 91 has a plurality of teeth 911 each having two convex sides 912 so that the convex side 912 will be in contact with the tooth of the pinion 92 at a point thereby reducing the friction between the toothed rack 91 and the pinion 92 and smoothening the relative motion between the toothed rack 91 and the pinion 92. Hence, the force required for converting the rotation of the pinion 92 into linear motion of the toothed rack 91 is reduced, so that even though the floating force produced by the float 9 in the liquefied gas is small, the float 9 can still rotate the pinion 92 to drive the toothed rack 91. Moreover, the lower end of the control rod 200 is loosely engaged with the head portion 931 of the toothed rack 91 so that slight movement is possible between the lower end of the control rod 200 and the head portion 931 of the toothed rack 91 thereby offsetting the frictional resistance caused by deflection due to manufacturing clearance and therefore making it smoother to transmit the motion of the toothed rack 93 to the control rod 200 without being stuck. The direct connection between the lower end of the control rod 220 and the head portion 931 of toothed rack 93 is such that a clearance is present therebetween to allow limited relative movement in a direction non-parallel to the transmission of the motion for making the transmission of the motion easier. The control rod 200 has an upper end extending upwardly into the valve body 90 to connect with a magnet 801. Thus, when the float 9 is moved, the pinion 92 will be rotated thereby moving the toothed rack 91 and the control rod 200 in unison with the float 9 and therefore moving the magnet 801 up or down in the valve body 90.

Referring to FIGS. 3 and 8, the plug 10 is a cylindrical member having an upper portion 101 formed with a plurality of longitudinal grooves 1011, a neck portion 102 under the upper portion 101 and fitted with an O-ring 1021, and a lower portion 103 having a smaller diameter than the axial through hole 231 of the second tubular member 2 and formed with a conical lower end 1031. The plug 10 is arranged within the second tubular member 2 and located under the piston 3.

The float rod 8 is an elongated member having a cam plate 81 at the upper end. The float rod 8 is integrally formed with the cam plate 81. The cam plate 81 of the float rod 8 is fitted into the slot 24 of the second tubular member 2 and pivotally connected thereto by the pin 251 extending through the radial circular hole 25 of the second tubular member 2 and the circular hole 72 of the float rod 8 so that the float rod 8 can be rotated with respect to the second tubular member 2. The cam plate 81 is contoured to form a lobe, a convex edge and a concave edge. The lower end of the float rod 8 is fixedly secured to the interior of the float 9.

The upper portion of the first tubular member 1 is engaged with the lower end of the valve body 90. The gauge 100 is provided with two clamps 1001 and 1002 for fixing on the valve body 90. The interior of the gauges 100 is provided with a permanent magnet 1003 and a needle 1004 which is operatively connected with the permanent magnet 1003. The structure of the gauge 100 may be of any conventional design well known to those skilled in the art. The gauge 100 is mounted on the valve body 90 so that the permanent magnet 1003 of the gauge is positioned against the permanent magnet 801 of the control rod 200.

Figure 5:
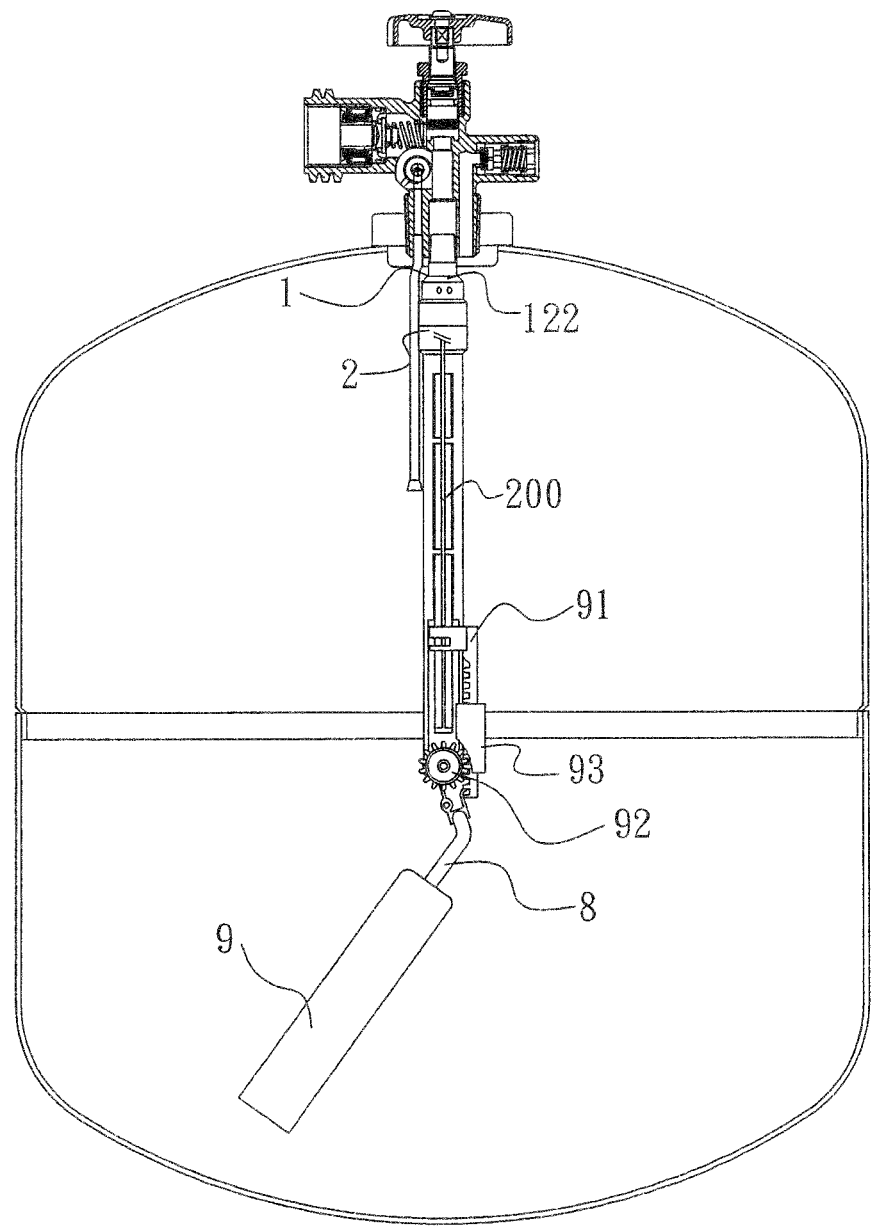
FIGS. 5, 6, 6A and 7 are sectional views illustrating the working principle of the present invention.
Figures 6, 6A:
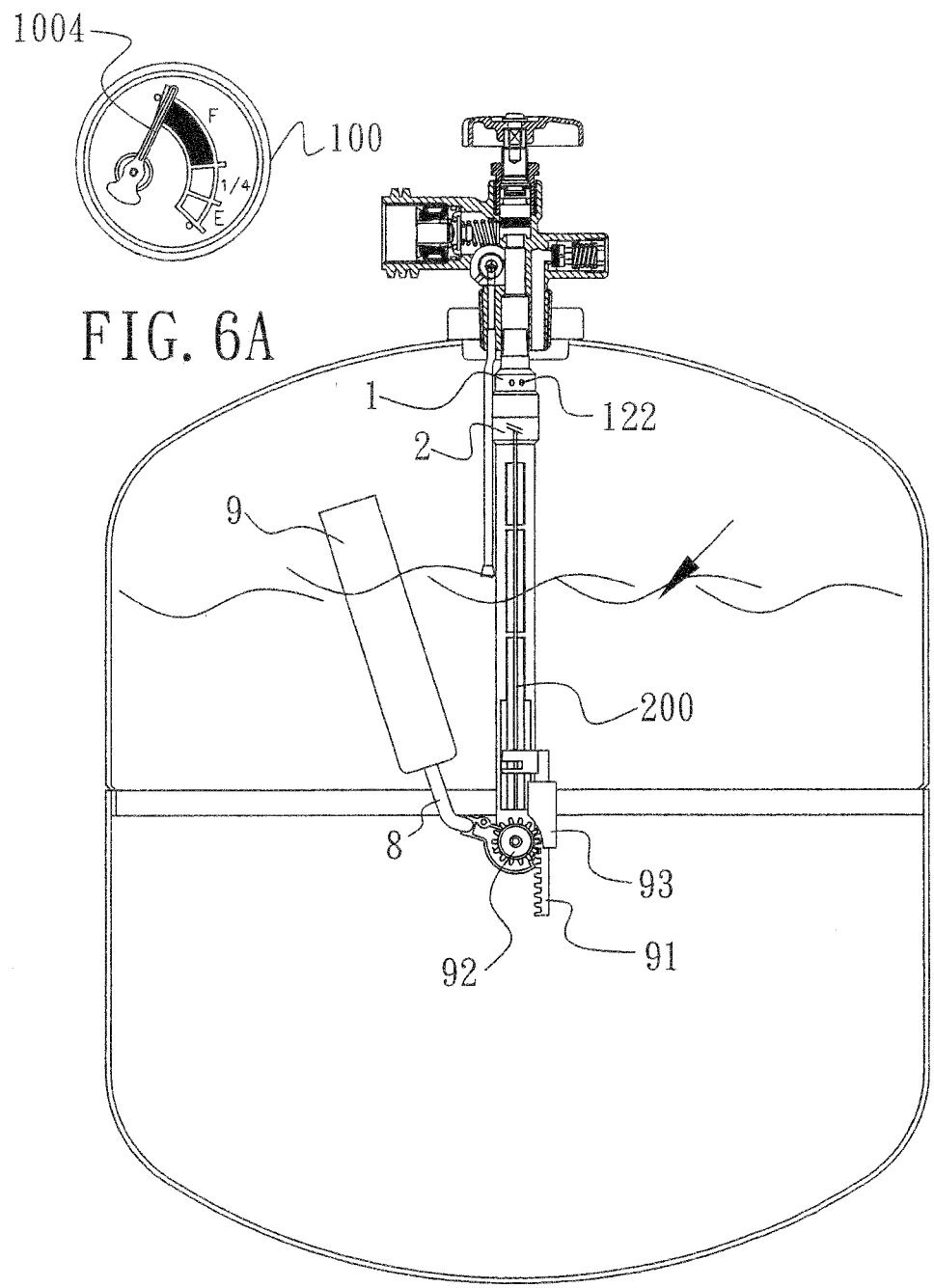
Figure 7:
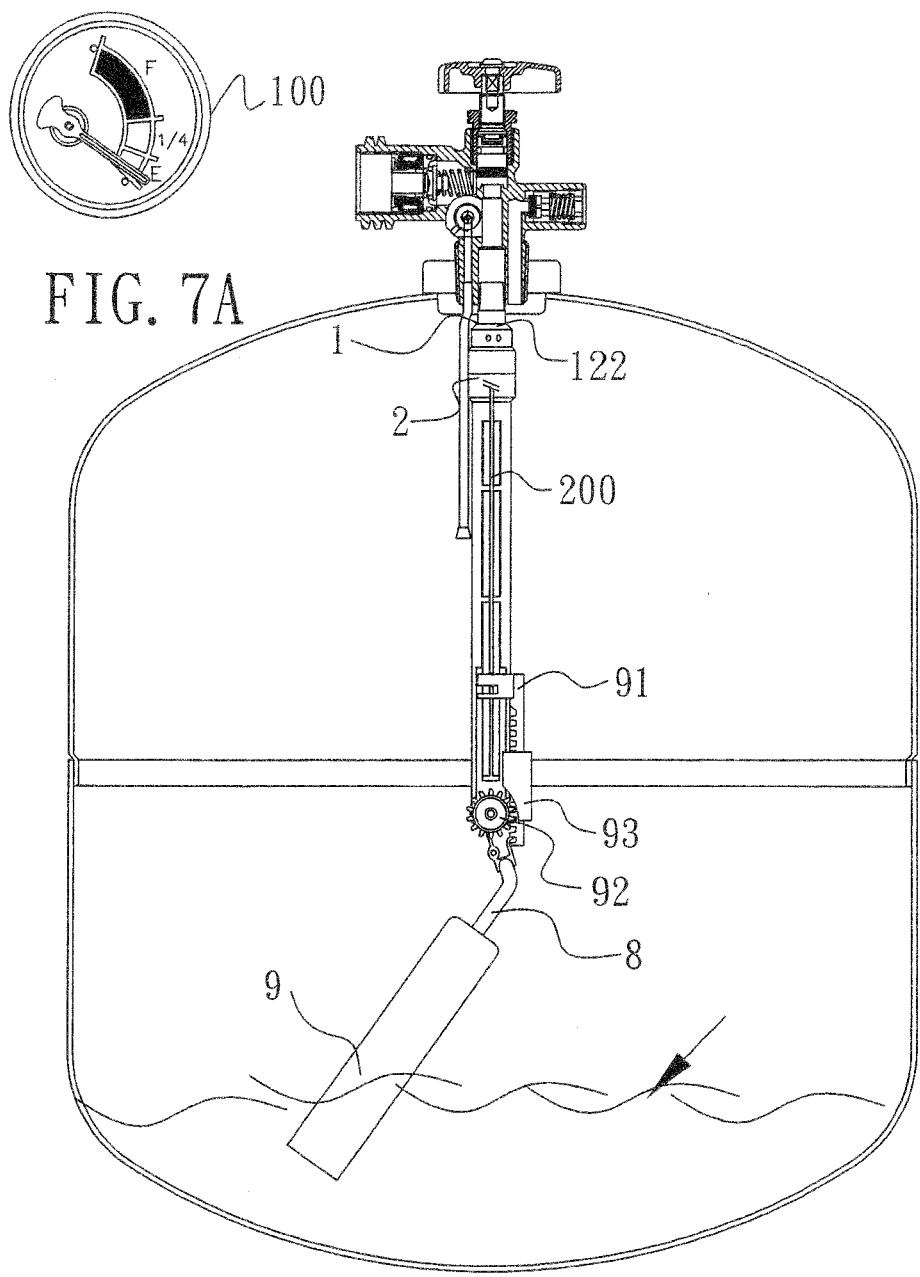

When in use (see FIGS. 5, 6 and 7), the upper end of the first tubular member 1 of the overfill prevention device according to the present invention is connected to a pressure valve. The pressure valve may be of any conventional design well known to those skilled in the art and is not considered a part of the invention. As the pressure valve is turned open, gas will flow through the pressure valve and the overfill prevention device into a tank. The float 9 will be positioned as shown in FIG. 8 when pressurized gas is being filled into the tank. When pressurized gas is being filled into the tank, the float 9 will be moved upward thereby causing the cam plate 81 to rotate. As the cam plate 81 is rotated from the convex edge to the concave edge, the plug 10 will go downward. The cam plate 81 will continue to rotate when pressurized gas keeps filling into the gas tank. As the pressure within the tank reaches the predetermined level, the float 9 will be rotated upwardly with respect to the second tubular member 2 thereby moving the concave edge of the cam plate 81 of the float rod 8 to the position right under the conical lower end 1031 of the plug 10. In the meantime, the upper end of the plug 10 is positioned to seal the axial through hole 221 of the second tubular member 2. As the gas cannot flow through the second tubular member 2, it will be forced to go upwardly thereby lifting the piston 3 until the first O-ring 4 bears against the first axial through hole 111 of the first tubular member 1 and the radial through holes 122 are closed by the intermediate portion 32 of the piston 3.

Hence, no more gas is allowed to flow through the overfill protection device according to the present invention when the pressure within the tank exceeds the predetermined level. As the control rod 200 will be moved in unison with the float 9, the magnet 801 mounted at the upper end of the control rod 200 will be moved up or down in the valve body 90 thereby forcing the magnet 1003 of the gauge 100 to move and therefore moving the needle 1004 to indicate the amount of gas remaining in the gas tank (see FIGS. 6A and 7A).

Figure 10:
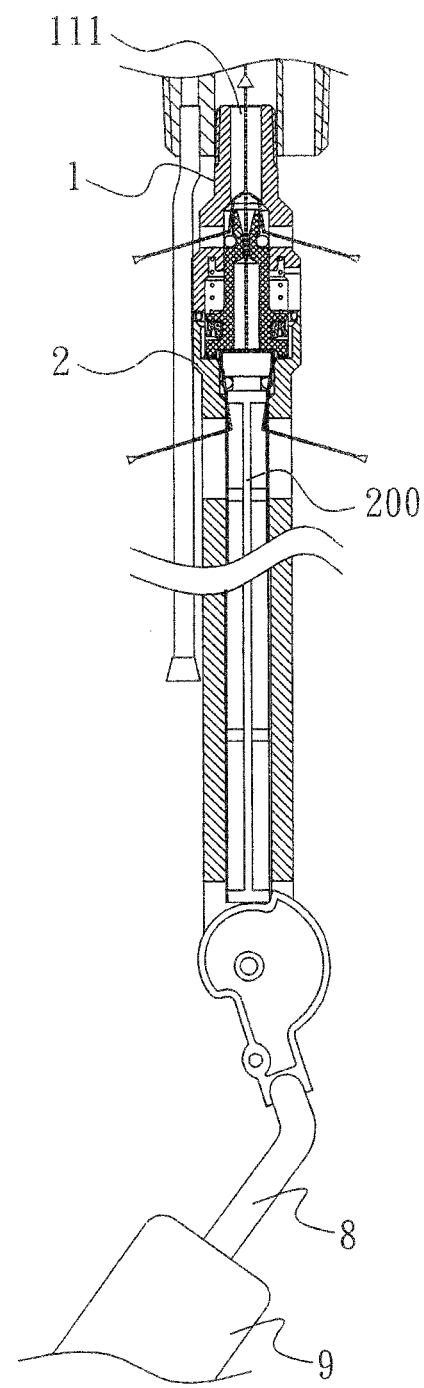
FIG. 10 is a longitudinal sectional view of the present invention in the purging position.

FIG. 10 is a longitudinal sectional view of the overfill prevention device in the purging position. As shown, most of the gas will directly flow out of the overfill prevention device through the radial through holes 111 of the first tubular member 1. In other words, the flow rate of the gas in purging will not be limited by the small passage of the piston thus largely decreasing the time required for gas purging.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An overfill prevention device comprising a first tubular member, a cylindrical piston slidably fitted within the first tubular member, a spring arranged within the first tubular member, a first and second O-rings fitted in the first and second neck portions of the piston, a second tubular member having a cylindrical recess open at a top, a plug arranged within the second tubular member, a float rod having a cam plate at an upper end, the cam plate being pivotally mounted to the second tubular member by a pin, a float connected with a lower end of the float rod, a valve body having a lower end engaged with the first tubular member, the improvement comprising that a pinion is pivotally connected to said second tubular member by said pin so that the cam plate and the pinion are rotatable in unison with each other, a toothed rack meshed with said pinion and slidably fitted in and circumferentially enclosed by a protruded block of said second tubular member, said toothed rack having a plurality of teeth each having two convex sides so that said convex sides will be in contact with teeth of said pinion at a point thereby reducing friction between said toothed rack and said pinion and therefore reducing force required for converting rotation of said pinion into linear motion of said toothed rack, so that even though floating force produced by said float in a liquefied gas is small, said float is still able to rotate said pinion to drive said toothed rack, a control rod having an upper end and a lower end, said lower end of said control rod being directly connected with a head portion of said toothed rack to transmit motion of said toothed rack to said control rod, wherein the direct connection between the said lower end of said control rod and said head portion of toothed rack is such that a clearance is present therebetween to allow limited relative movement in a direction non-parallel to the transmission of the motion for making the transmission of the motion easier and without being stuck, said upper end of said control rod extending upwardly into said valve body, said lower end being secured to said toothed rack, a first magnet mounted at said upper end of said control rod, and a gauge mounted on said valve body and provided with a second permanent magnet and a needle operatively connected with said second magnet, whereby when said float is moved, said pinion will be rotated thereby moving said toothed rack and said control rod in unison with said float, so that said first magnet mounted at said upper end of said control rod will be moved up or down in said valve body thereby forcing said second magnet to move and therefore moving said needle to indicate amount of gas remaining in a gas tank.

2. The overfill prevention device as claimed in claim 1, wherein said piston has a conical through hole that has an upper diameter and a lower diameter which are in a ratio of three to one.

3. The overfill prevention device as claimed in claim 1, wherein said first tubular member is formed with a radial perforation extending through said first tubular member.

* * * * *